United States Patent
Leroy-Delage et al.

(10) Patent No.: US 6,907,929 B2
(45) Date of Patent: Jun. 21, 2005

(54) CEMENTING COMPOSITIONS AND THE USE OF SUCH COMPOSITIONS FOR CEMENTING WELLS

(75) Inventors: Sylvaine Leroy-Delage, Paris (FR); Bernard Dargaud, Elancourt (FR); Marc Thiercelin, Ville d'Avray (FR); Jean-François Baret, Paris (FR)

(73) Assignee: Schlumberger Technology Corporation, Sugar Land, TX (US)

( * ) Notice: Subject to any disclaimer, the term of this patent is extended or adjusted under 35 U.S.C. 154(b) by 87 days.

(21) Appl. No.: 10/621,083

(22) Filed: Jul. 17, 2003

(65) Prior Publication Data

US 2004/0007360 A1 Jan. 15, 2004

Related U.S. Application Data

(63) Continuation of application No. 09/806,731, filed on Jun. 29, 2001, now abandoned.

(51) Int. Cl.[7] ............................................. E21B 33/133
(52) U.S. Cl. ..................... 166/293; 106/696; 106/724
(58) Field of Search ................................. 166/292–294; 106/696, 724

(56) References Cited

U.S. PATENT DOCUMENTS

| | | |
|---|---|---|
| 4,520,859 A | 6/1985 | Fournier et al. ............. 164/253 |
| 5,391,226 A | 2/1995 | Frankowski ................. 106/696 |
| 5,456,751 A | 10/1995 | Zandi et al. ................. 106/724 |
| 5,779,787 A | 7/1998 | Brothers et al. ............. 106/802 |
| 6,143,069 A | 11/2000 | Brothers et al. ............. 106/678 |
| 6,197,106 B1 | 3/2001 | Tieckelmann et al. ...... 106/644 |
| 6,312,515 B1 * | 11/2001 | Barlet-Gouedard et al. . 106/709 |

FOREIGN PATENT DOCUMENTS

| | | |
|---|---|---|
| EP | 0903462 | 5/2003 |
| SU | 1323699 | 7/1987 |
| SU | 1384724 | 3/1988 |
| SU | 1447775 | 12/1988 |

OTHER PUBLICATIONS

SPE 38598—*Cement Design Based on Cement Mechanical Response* by M.J. Thiercelin, B.Dargaud, J.F.Baret and W.J.Rodriguez.

* cited by examiner

Primary Examiner—Zakiya Walker
(74) Attorney, Agent, or Firm—Thomas O. Mitchell; Robin Nava; Brigitte L. Echols

(57) ABSTRACT

Cementing compositions for oil wells or the like comprise between 30% and 100% (by weight of cement) of rubber particles, with grain size in the 40–60 mesh range. Adding rubber particles in accordance with the invention produces a low density slurry while keeping the cement permeability low. Compositions of the invention are particularly advantageous for cementing zones subjected to extreme dynamic stresses such as perforation zones and the junctions of branches in a multi-sidetrack well.

10 Claims, 3 Drawing Sheets

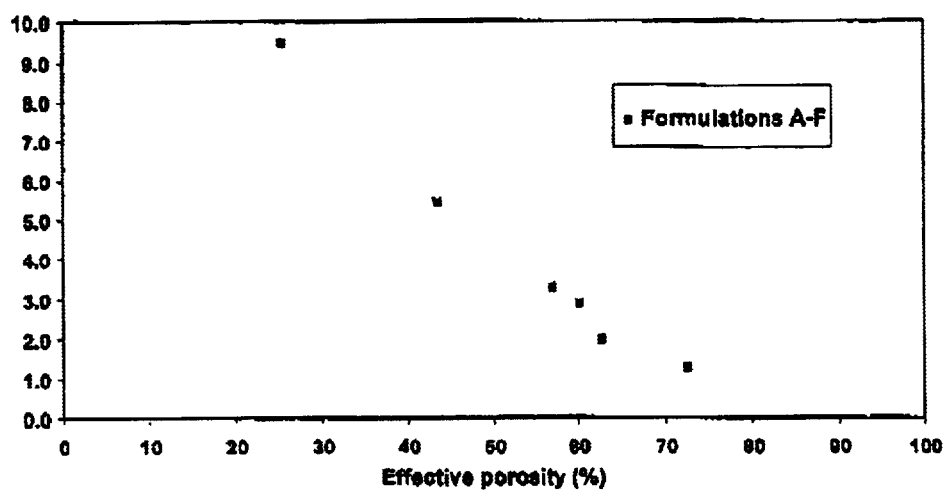
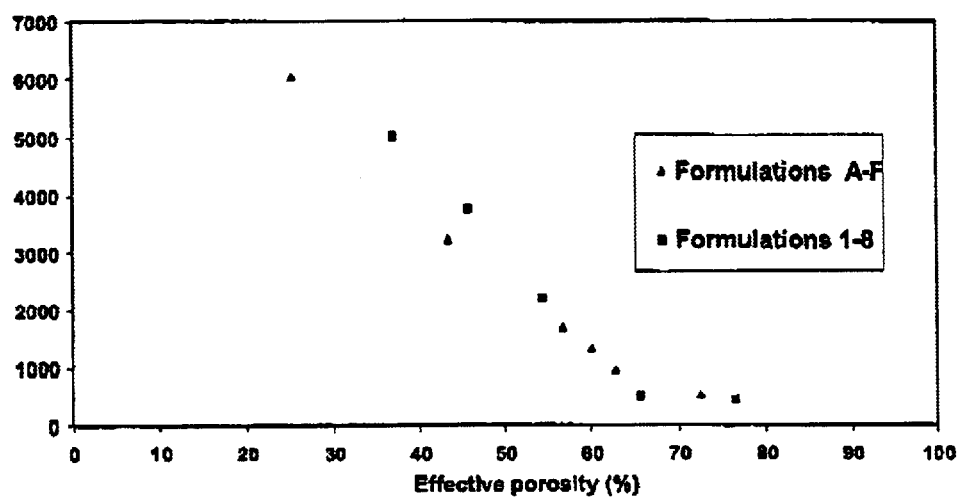

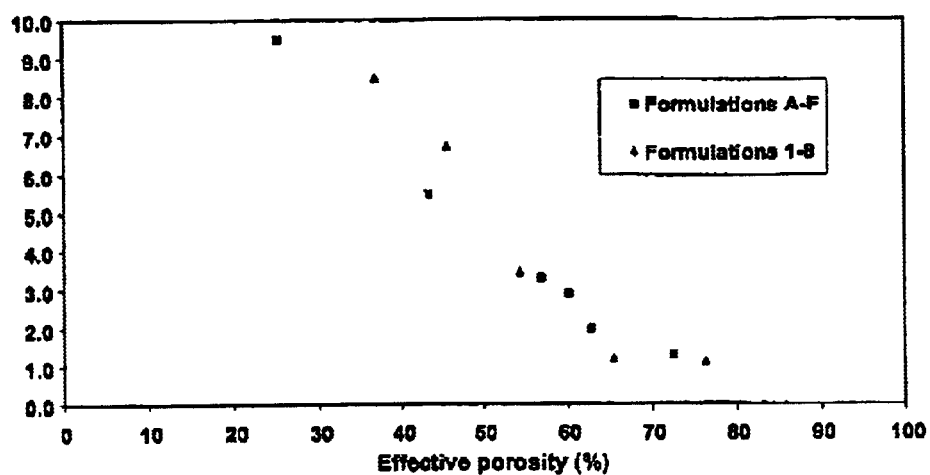
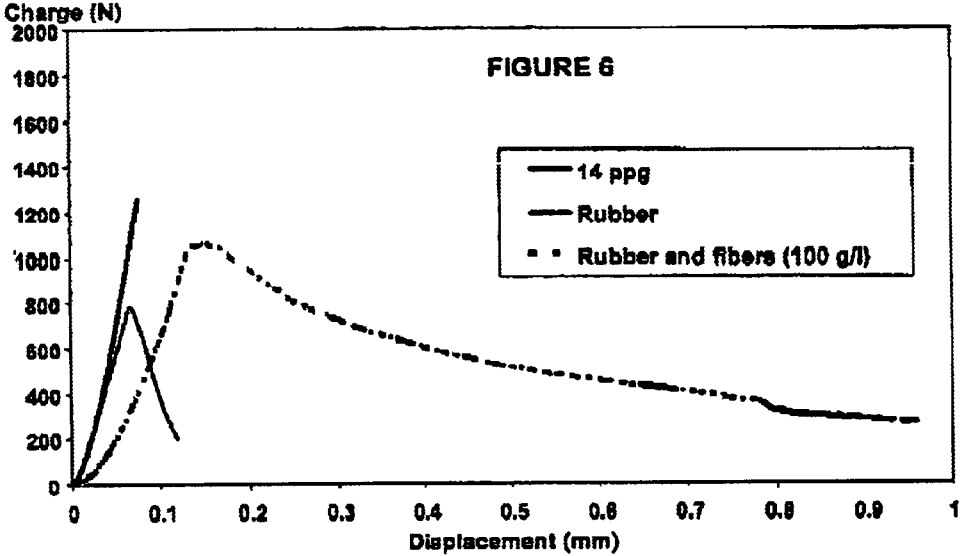

CEMENTING COMPOSITIONS AND THE USE OF SUCH COMPOSITIONS FOR CEMENTING WELLS

CROSS REFERENCE TO RELATED APPLICATION

This application is a Continuation of U.S. patent application Ser. No. 09/806,731 which was filed on Jun. 29, 2001, now abandoned, which is incorporated by reference in its entirety.

BACKGROUND OF THE INVENTION

The present invention relates to techniques for drilling oil, gas, water, geothermal, or analogous wells. More precisely, the invention relates to cementing compositions which are suitable for cementing zones which are subjected to extreme dynamic stresses.

In general, a well which is more than a few hundreds of meters deep is cased, and the annular space between the underground formation and the casing is cemented over all or a portion of its depth. The essential function of cementing is to prevent fluid exchange between the different formation layers through which the hole passes and to control the ingress of fluid into the well, in particular to limit the ingress of water. In production zones, the casing, the cement and the formation are all perforated over a depth of a few centimeters.

The cement positioned in the annular space in an oil well is subjected to a number of stresses throughout the lifetime of the well. The pressure inside the casing can increase or decrease as the fluid filling it changes or as additional pressure is applied to the well, such as when the drilling fluid is replaced by a completion fluid or by a fluid used in a stimulation operation. A change of temperature also creates stress in the cement, at least during the transition period before the temperatures of the steel and the cement come into equilibrium. In the majority of the above cases, the stressing process is sufficiently slow to enable it to be treated as a static process.

However, the cement is subjected to other stresses which are dynamic in nature either because they occur over a very short period or because they are either periodical or repetitive to a greater or lesser extent. Perforating does not just cause an over-pressure of a few hundred bars inside the well which dissipates in the form of a shock wave. In addition, perforating creates a shock when the projectile penetrates the cement and that shock subjects the zone surrounding the hole to large forces extending over a length of a few meters.

Another process which creates dynamic stresses in the cement and which is now very common in oilwell operations is when a window is cut in a cemented casing to create a sidetrack. Milling the steel over a depth of a few meters followed by drilling a sidetrack subjects the cement to shock and to vibration which often damage it irreversibly.

The present invention aims to provide novel formulations, in particular for cementing regions in oil or analogous wells which are subjected to extreme dynamic stresses such as perforation zones and junctions for branches of a sidetrack.

In an article presented at the SPE (Society of Petroleum Engineers) annual conference and exhibition 1997 (SPE 38598, 5–8 Oct. 1997) and in French patent application FR 97 11821, 23$^{rd}$ Sep. 1997) Marc Thiercelin et al. have shown that the risk of rupture of a cement sheath depends on the thermoelastic properties of the casing, on the cement, and on the formation which surrounds the well. A detailed analysis of the mechanisms leading to rupture of the cement sheath has shown that the risk of rupture of a cement sheath following an increase in pressure and/or temperature in the well is directly linked to the tensile strength of the cement and is attenuated when the ratio of the tensile strength $R_T$ of the cement over its Young's modulus E is increased.

The aim of the present invention is to provide lighter oilwell cements reinforced with recycled rubber. The ground rubber particles reduce the density of the slurry and thus, secondarily, affect the flexibility of the system; primarily, the rubber particles do not improve the mechanical properties of the cements.

In the building industry, including rubber particles in concrete is known to improve toughness, durability, and resilience [see, for example, N. N. Eldin and A. B. Sinouci, Rubber-Tire Particles as Concrete Aggregate, Journal of Materials in Civil Engineering, 5, 4, 478–497 (1993)]. Concretes including rubber particles in their formulations have applications, for example, in motorway construction to absorb shocks, in anti-noise walls as sound absorbing material, and also in constructing buildings to absorb seismic waves during earthquakes. For those applications, the aim of the rubber particles is thus essentially to improve the mechanical properties of the concrete.

The addition of ground rubber particles (with grain size in the 4–20 mesh range) is known in the oilwell cement industry [Well cementing 1990, E. B Nelson, Schlumberger Educational Services] to improve impact strength and bending strength. Such an improvement in mechanical properties is also indicated in Russian patents SU-1384724 and SU-1323699. More recently, U.S. Pat. No. 5,779,787 has proposed the use of particles derived from recycling automobile tires, with grain sizes in the 10/20 mesh (850–2000 $\mu$m) or 20/30 mesh (600–850 $\mu$m) range, to improve the mechanical properties of hardened cements, in particular their resilience, ductility, and expansion properties. It should be noted that the densities of the slurries disclosed in that American patent were in the range 1.72 g/cm$^3$ to 2.28 g/cm$^3$.

SUMMARY OF THE INVENTION

In contrast to the prior art disclosures, the present invention aims to provide a slurry with a density not exceeding 1.70 g/cm$^3$ and which can, for example, be as low as 1.44 g/cm$^3$. In other words, the invention consists in preparing a low density slurry by replacing a portion of the mixing water with rubber particles of a density (1.2 g/cm$^3$) which is close to that of water. Thus a cement is produced with low permeability and with improved impact strength. Secondarily, the rubber particles also impart flexibility to the system by reducing its Young's modulus. This results in a reduction in permeability, a reduction in the compressibility of the system, and an increase in shock resistance even though primarily, the rubber particles do not improve the mechanical properties of the cements.

BRIEF DESCRIPTION OF THE DRAWINGS

FIG. 3 shows how the Young's modulus of rupture in bending of non-optimized cement formulations of the invention vary as a function of effective porosity.

FIG. 4 shows how the Young's modulus in bending of the non-optimized cement formulations of the invention and of complete formulations of the invention vary as a function of effective porosity.

FIG. 5 shows how the Young's modulus of rupture in bending of non-optimized cement formulations of the invention and of complete formulations of the invention vary as a function of effective porosity.

FIG. 6 is a graph of displacement as a function of load exerted during the bending test.

DETAILED DESCRIPTION OF THE INVENTION

Figure 1:
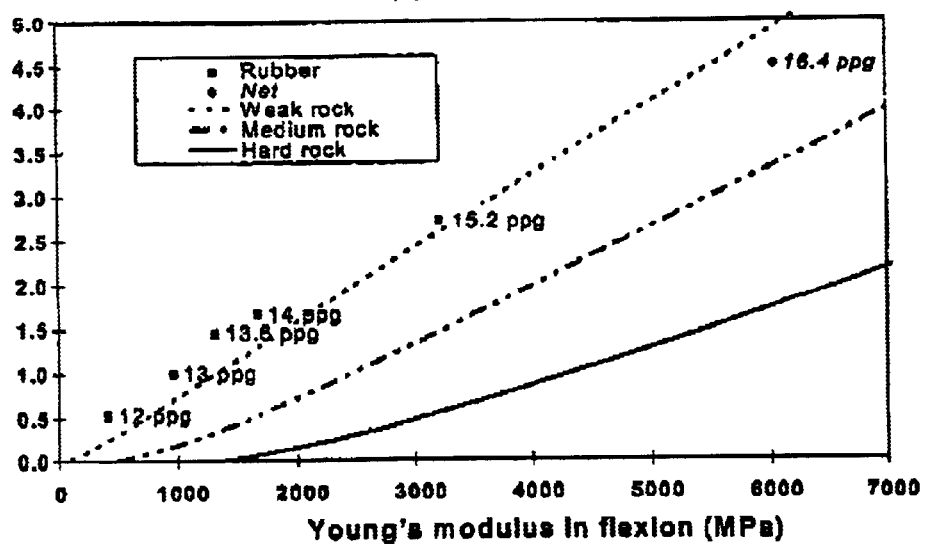
FIG. 1 shows the tensile strength of cements as a function of the Young's modulus in bending of the cement.

The cement slurries of the invention are essentially constituted by cement, water, and between 30% and 100% (by weight of cement) of rubber particles obtained, for example, by grinding recycled automobile tires, with grain sizes in the 40–60 mesh (250–425 $\mu$m) range. The rubber particles used originate from recycled tires from the automobile industry. They are obtained by grinding or low temperature disintegration of tires. Particles with a diameter in the range 250 $\mu$m to 400 $\mu$m are particularly preferred. Such grain sizes produce pumpable slurries with suitable rheology.

The formulations of the invention are preferably based on class A, B, C, G, and H Portland cements as defined in section 10 of the American Petroleum Institute (API) standards. Class G Portland cements are particularly preferred, but other cements which are known in the art can also be put to profitable use. For low temperature applications, aluminous cements are particularly suitable, also Portland/plaster mixtures for low temperature wells (deep water wells, for example), or cement/silica mixtures (for wells where the temperature exceeds 120° C., for example).

The water used to constitute the slurries is preferably low mineral water such as tap water. Other water, such as sea water, can optionally be used, but it is not generally preferred.

The compositions of the invention can also comprise additives which are routinely used in the majority of cementing compositions, for example dispersing agents, antifoam agents, suspension agents, cement retarders or accelerating agents, and fluid loss control agents.

In a variation, the cementing compositions are also reinforced by adding cast amorphous metal fibers. Cast amorphous metal fibers are known, for example, from U.S. Pat. No. 4,520,859 and are obtained by casting a thin ribbon of molten metal onto a cold drum. Rapid cooling prevents crystallization, and the metal solidifies in the form of an amorphous material. The length of the fibers used—or, more exactly, the strips—is typically of the order of ten millimeters, preferably in the range 5 to 15 mm.

The cast amorphous metal fibers are added to the cement slurry of the invention in an amount of 1% to 25% by weight of fibers relative to the weight of cement, i.e., typically with fiber concentrations of the order of 50 kg/m$^3$ to 200 kg/m$^3$.

Adding cast amorphous metal fibers can advantageously compensate for the reduction in compressive strength which results from adding rubber particles, while increasing the modulus of rupture in bending and the ratio of that modulus over Young's modulus.

The present invention is illustrated in the following examples.

EXAMPLE 1

Non optimized formulations were used to show the basic principle of the invention. With the exception of a dispersing agent, they did not include cementing additives. In this example, the recycled rubber originated from American Tire Recyclers, Inc., Jacksonville, United States of America. Its trade name is "Ground Rubber 40 mesh". Its density was 1.2 g/cm$^3$, and its granulometry was 40 mesh (425 $\mu$m).

The cement slurries were composed of class G Portland Dyckerhoff North cement, recycled rubber particles, water, and a dispersing agent. The formulations are given in Table 1; they were all studied at the same temperature (170° F., i.e., 76.7° C.). The dispersing agent was a polynaphthalene sulfonate, in liquid form.

TABLE 1

Cement slurry formulations

| Formulation | Density (ppg-g/cm$^3$) | Water (vol %) | Rubber (vol %) | Cement (vol %) | Other additives (=dispersing agents) vol % |
|---|---|---|---|---|---|
| A | 12.0-1.44 | 50.0 | 32.5 | 17.5 | 0 |
| B | 13.1-1.56 | 55.0 | 20.2 | 24.8 | 0 |
| C | 13.6-1.63 | 49.9 | 22.5 | 27.5 | 0.1 |
| D | 14.1-1.69 | 44.7 | 24.7 | 30.3 | 0.3 |
| E | 15.2-1.82 | 49.6 | 12.5 | 37.5 | 0.4 |
| F | 16.4-1.97 | 53.5 | 0 | 44.8 | 1.7 | ppg is an abbreviation for "pounds per gallon".

The rheology of the cement slurry and the free water were measured using the procedure recommended in API 10. The rheology was measured immediately after mixing at laboratory room temperature, and the rheology was measured after 20 minutes of conditioning at temperature. The results are shown in Table 2. PV means plastic viscosity and TY means yield point.

TABLE 2

Rheology and free water

| | Rheology after mixing | | Rheology after conditioning at 76.7° C. | | Free water after 2 hours |
|---|---|---|---|---|---|
| Formulation | PV (mPa · s) | TY (Pa) | PV (mPa · s) | TY (Pa) | (ml) |
| A | 58.8 | 1.9 | 87.1 | 9.3 | 0 |
| B | 25.2 | 2.4 | 97 | 32.4 | 0 |
| C | 48.5 | 5.3 | 98.3 | 11.6 | 0 |
| D | 120.2 | 7.7 | 179.9 | 12.6 | 0 |
| E | 57.8 | 1.9 | 87 | 25.3 | 0 |
| F | 50.8 | 1.7 | 24.0 | 1.9 | 1 |

The bending tests were carried out on 3 cm×3 cm×12 cm prisms obtained from cement slurries kept at 76.7° C. and 20.68 MPa (3000 psi) for 3 days. The compression tests were carried out on cubes with 5 cm sides (2 inches) obtained after 3 days at 76.7° C. and 20.68 MPa.

The results are shown in Table 3 for the bending strength (rupture modulus Mr and Young's modulus in bending Ef) and compressive strengths (compressive strength Cs and Young's modulus in compression Ec). Bending strength was easier to measure than tensile strength. It was empirically estimated that the bending strength was twice as high as the tensile strength.

TABLE 3

MECHANICAL PROPERTIES

| Formulation | Mr (MPa) | Ef (MPa) | Mr/Ef (×1000) | CS (MPa) | Ec (MPa) | CS/Ec (×1000) |
|---|---|---|---|---|---|---|
| A | 1.29 | 516.70 | 2.52 | 2.88 | 496.65 | 5.80 |
| B | 1.98 | 963.58 | 2.07 | 5.73 | 1049.10 | 5.48 |
| C | 2.90 | 1320.12 | 2.21 | 7.93 | 1431.87 | 5.63 |
| D | 3.31 | 1678.04 | 2.02 | 12.46 | 2416.31 | 5.17 |
| E | 5.45 | 3223.38 | 1.71 | 20.21 | 3608.18 | 5.61 |
| F | 9.05 | 6042.4 | 1.52 | 27.51 | 4800.88 | 5.82 |

The above results show that an increase in rubber particle concentrations in the cement slurry simultaneously results in:

- a reduction in its modulus of rupture;
- a reduction in its compressive strength;
- a reduction in its Young's modulus in bending and also in compression;
- an increase in the ratio of its modulus of rupture in bending over its Young's modulus in bending.

In order to compare these different systems, a flexibility criterion was defined (denoted MT below): a cement is considered to be better if the ratio of its modulus of rupture in bending over its Young's modulus in bending is higher. This flexibility criterion can, for example, be observed in FIG. 1 where the tensile strength of the cement is shown as a function of the Young's modulus in bending of the cement. This figure was obtained using the following assumptions: the casing had an outside diameter of 8½" (21.6 cm) and an inside diameter of 7" (17.8 cm), the steel grade was 35 lb/ft (52 kg/m), and the pressure increase in the well was assumed to be 5000 psi (34.5 MPa).

This figure shows the minimum required condition for three rock types (hard rock, medium rock, and poorly consolidated rock). Each curve obtained defines the minimum condition required for good cement strength for the geometry and the pressure increases selected for this example. For a given rock, a cement was deemed satisfactory if its characteristics (tensile strength and Young's modulus in bending) placed it above the curve.

Thus formulations A to E satisfy the flexibility criterion regardless of the rock.

However, these tendencies are directly linked to a reduction in density resulting from an increase in the concentration of rubber particles and thus in the porosity of the system. Thus the porosity of the different cement samples obtained after 3 days setting at 76.7° C. and 20.68 MPa (3000 psi) was measured for the different formulations.

The principle of the porosity measurement was as follows. 12.7 mm (½ inch) diameter cylinders 1 cm in length were cut from the hardened cement set under temperature and pressure. They were dried for about two weeks in a lyophilizer and during this time their weight loss was studied as a function of time. When the samples were dry (corresponding to a constant weight over time), their real volume or skeleton volume Vs was measured using a helium pycnometer; the average volume Vb was obtained from the external dimensions of the cylinder. The difference between the two volumes (Vb−Vs) gave the void volume and thus the porosity Φ of the material accessible to the helium.

The porosity Φ of the slurry was the % by volume of the water and liquid additives in the formulation. For each formulation, a percentage volume for rubber was calculated and the effective porosity Φ was defined as the sum of the porosity of the material plus the percentage volume of the rubber. The results are shown in Table 4.

TABLE 4

RESULTS FOR POROSITY Φ

| Formulation | Φ slurry (1) % | Φ material (2) % | Vol. of rubber (3) % | Φ effective (2) + (3) (%) |
|---|---|---|---|---|
| A | 50 | 40.7 | 32.5 | 73.2 |
| B | 55 | 42.5 | 20.2 | 62.7 |
| C | 50 | 37.6 | 22.5 | 60.1 |
| D | 45 | 32.1 | 24.8 | 56.9 |
| E | 50 | 30.9 | 12.5 | 43.4 |
| F | 55 | 25.3 | 0 | 25.3 |

Figure 2:
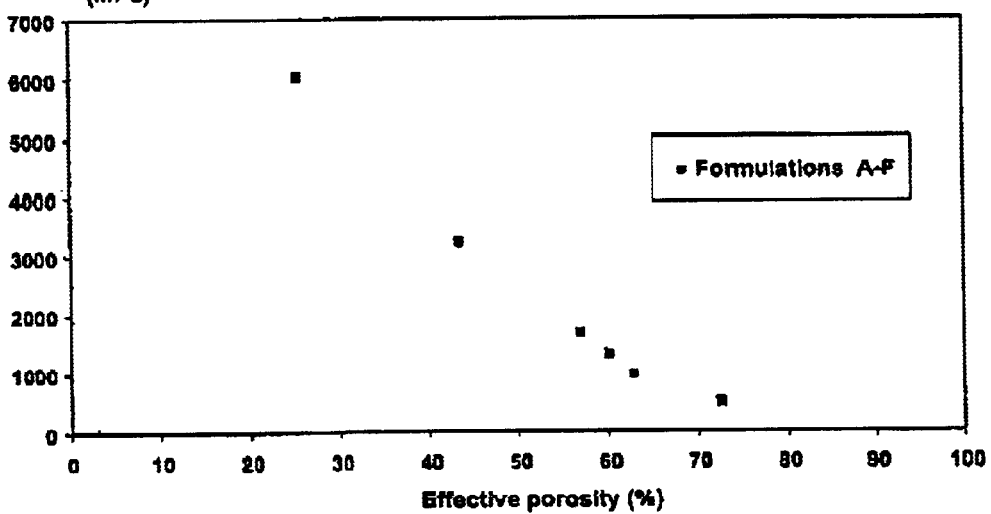
FIG. 2 shows how the Young's modulus in bending of non-optimized cement formulations of the invention vary as a function of effective porosity.

FIGS. 2 and 3 show how Young's modulus in bending and modulus of rupture in bending vary as a function of effective porosity; it can be seen that Young's modulus decreases almost linearly as a function of effective porosity with a saturation threshold after 70% porosity (FIG. 2). The same comment applies to modulus of rupture in bending (FIG. 3).

In conclusion, it appears that ground rubber particles can reduce slurry density and thus, secondarily, affect the flexibility of the system. Primarily, rubber particles do not improve the mechanical properties of the cements.

EXAMPLE 2

Examples of complete formulations are given.

The cement slurries were composed of class G Portland Dyckerhoff North cement, recycled rubber particles, water and different additives (anti-foaming agent and retarder; the retarder was different depending on the temperature). Table 5 lists the formulations. Formulations 1 and 7 contained no rubber particles. Formulations 2 to 5 comprised 40 mesh rubber identical to that of the preceding example. Formulation 6 used a 45 mesh (355 μm) rubber available from Vredenstein Rubber Resources, Maastricht, Netherlands reference ECORR RNM 45, density 1.2 g/cm³.

The influence of parameters such as slurry density and the optimization temperature were studied. For temperatures of 120° C. or more, silica flour was used for retrocession strength problems.

It is important to dry blend the rubber particles with the cement. Otherwise, poor incorporation or migration of the rubber to the surface after mixing is observed.

TABLE 5

LIST OF FORMULATIONS STUDIED

| | Tm (° C.) | Density (g/cm³) | Water (% vol.) | Rubber (% vol) | Cement (% vol) | Other additives (% vol.) |
|---|---|---|---|---|---|---|
| 1 | 76.7 | 1.68 | 67.3 | 0 | 31.7 | 1.0 |
| 2 | 76.7 | 1.68 | 44.5 | 24.8 | 30.3 | 0.4 |
| 3 | 121.1 | 1.68 | 45.3 | 21.6 | 22.9 | 10.2 |
| 4 | 150 | 1.68 | 46.0 | 21.6 | 22.9 | 9.5 |
| 5 | 76.7 | 1.44 | 50.0 | 32.5 | 17.1 | 0.4 |
| 6 | 76.7 | 1.68 | 44.2 | 24.8 | 30.3 | 0.7 |
| 7 | 76.7 | 1.44 | 79.3 | 0 | 20.2 | 0.5 |

The detailed composition of the "other additives" is given in the table below.

| | Silica flour % bwoc | Retarder (l/m³ of cement) | Anti-sedimentation agent % bwoc | Anti-foaming agent (l/m³ of cement) | Extender % bwoc |
|---|---|---|---|---|---|
| 1 | 0 | 10.7 | / | 4.0 | 4 |
| 2 | 0 | 8.02 | 0.26 | / | / |
| 3 | 35 | 14.71 | 0.34 | / | / |
| 4 | 35 | 0.60* | 0.34 | / | / |
| 5 | 0 | / | / | / | 1.7 |
| 6 | 0 | 13.37 | / | / | / |
| 7 | 0 | / | / | 4.0 | 1.7 | bwoc is an abbreviation for "by weight of cement".
*0.60% bwoc, the retarder used at this temperature being solid.

For formulations 1 and 5, the extender was bentonite. For formulation 7, sodium silicate was used. It should be noted that all of the formulations were optimized so as to obtain a thickening time in the range 2 to 6 hours. The rheology of the cement slurry and the free water were measured using the procedure recommended in API 10 (American Petroleum Institute). The results are shown in Table 6.

Formulation D with the new source of rubber was not API mixable, and a portion of the rubber remained on the surface. This phenomenon persisted even if, for example, the added concentration of dispersing agent (a polynaphthalene sulfate) was multiplied by 2.

Regarding formulation 2, it was observed that the slurry was a poor API mix and that after conditioning, the cement slurry was very thick and cast badly. To reduce its viscosity by leaving out the anti-sedimentation agent and keeping the retarder, it was necessary during blending to mix for 10 minutes at 12000 rpm (revolutions per minute) before no more particles were observed on the surface, and the fluid obtained after mixing and conditioning at temperature was very thick and cast badly.

EXAMPLE 4

The bending and compression mechanical properties of a cement slurry containing recycled and ground rubber particles were measured. The exact formulations are given in Example 1. Further, by way of comparison with the preceding formulations, a NET (neat cement+water) was added (formulation 8) with a density of 1.89 g/cm³ with 4.01 l/m³ of anti-foaming agent as the only additive and containing no rubber particles.

The influence of the ground rubber particles on the mechanical properties of the set cement was studied on

TABLE 6

RHEOLOGY AND FREE WATER

| Formulation | Thickening time (min) | Rheology after mixing | | Rheology after conditioning at Tm* | | Free water after 2 hrs ml |
|---|---|---|---|---|---|---|
| | | PV (mPa·s) | TY (Pa) | PV (mPa·s) | TY (Pa) | |
| 1 | 354 | 12.7 | 1.7 | 11.2 | 12.8 | 3 |
| 2 | 333 | 97.3 | 15.6 | 215.6 | 17.0 | 2 |
| 3 | 372 | 119.7 | 13.9 | 61.6 | 7.1 | 1 |
| 4 | 260 | 152.5 | 8.1 | 101.6 | 8.5 | 0 |
| 5 | 128 | 96.2 | 20.3 | 75.4 | 8.5 | 0 |
| 6 | 262 | 290.8 | 0.9 | 175.8 | 23.7 | 2 |
| 7 | not measured | 9.2 | 4.7 | 8.5 | 4.1 | 0 |

*For formulations 3 and 4, for technical reasons the rheology was measured at 85° C. and not at temperature Tm as indicated in Table 5.

EXAMPLE 3

Ground rubber particles of 32 mesh grain size (500 μm) were tested.

In this example, two slurry formulations were used as already described in the preceding examples: formulation D of Example 1, and formulation 2 of Example 2; they were both formulated to 14 ppg (1.68 g/cm³) with a slurry porosity of 45% and comprised 30% bwoc of rubber particles. The only change was in the rubber particles which differed in their manufacturer and in their grain size, the 32 (500 μm) mesh sized grains replacing the 40 (425 μm) mesh sized grains.

systems kept for several days under pressure and temperature in high pressure and high temperature chambers to simulate the conditions encountered in an oilwell.

Bending and compression tests were carried out under the same conditions as for Example 1, at the conditioning temperatures indicated in Table 5; the same abbreviations are used in Table 7 below. From the bending and compression tests, the quantity of energy released on rupture (obtained by integrating the load-displacement curve over a displacement in the range from 0 to the maximum displacement of the load (corresponding to rupture).

TABLE 7

MECHANICAL PROPERTIES

| | Mr (MPa) | Ef (MPa) | Mr/Ef (×1000) | Rupture energy, bending (J) | CS (MPa) | Ec (MPa) | CS/Ec (×1000) | Rupture energy, compression (J) |
|---|---|---|---|---|---|---|---|---|
| 1 | 6.69 | 3758.81 | 1.81 | 0.0437 | 22.88 | 3341.82 | 6.88 | 12.97 |
| 2 | 3.44 | 2213.71 | 1.57 | 0.0223 | 9.97 | 1370.72 | 7.31 | 7.94 |

TABLE 7-continued

MECHANICAL PROPERTIES

| | Mr (MPa) | Ef (MPa) | Mr/Ef (×1000) | Rupture energy, bending (J) | CS (MPa) | Ec (MPa) | CS/Ec (×1000) | Rupture energy, compression (J) |
|---|---|---|---|---|---|---|---|---|
| 3 | 3.61 | 1849.87 | 1.98 | 0.0292 | 9.51 | 2062.34 | 4.58 | 5.37 |
| 4 | 4.68 | 2905.07 | 1.63 | 0.0318 | 13.81 | 2589.84 | 5.62 | 8.71 |
| 5 | 1.11 | 443.05 | 2.52 | 0.0122 | 2.51 | 647.67 | 3.88 | 1.79 |
| 6 | 4.24 | 2383.70 | 1.78 | 0.0305 | 13.78 | 2897.45 | 4.77 | 6.97 |
| 7 | 1.19 | 504.22 | 2.37 | 0.0101 | 3.21 | 519.64 | 6.24 | 1.88 |
| 8 | 8.47 | 5021.56 | 1.69 | 0.0706 | 36.61 | 6257.28 | 5.85 | 16.22 |

For formulations with a density of 1.68 g/cm$^3$ (14 ppg), adding rubber particles reduced the modulus of rupture in bending but also reduced the Young's modulus. However, the ratios of the modulus of rupture in bending to Young's modulus remained high and satisfied the flexibility criterion defined above. It was possible to retard a system with rubber particles and for the whole range of temperatures studied, the cement obtained satisfied the flexibility criterion.

The compressive strengths were reduced on adding rubber particles but their values remained acceptable.

The porosity of the hardened material was measured for different formulations of cement slurry. The principle of measuring the porosity of the material was defined in Example 1. The porosity results are shown in Table 8. As expected, they show that adding rubber particles reduced the porosity Φ of the final material (comparing formulation 1 with formulation 2, for example). As in Example 1, it was observed that Young's modulus in bending decreased almost linearly as a function of effective porosity with a saturation threshold after 70% porosity (FIG. 4) for all of the optimized formulations at 76.76° C. The same comment applies to modulus of rupture in bending (FIG. 5).

The conclusions of Example 1 are confirmed for optimized formulations: ground rubber particles reduce the density of the slurry and thus secondarily affect the flexibility of the system; primarily, the rubber particles do not improve the mechanical properties of the cements.

TABLE 8

POROSITY RESULTS

| Formulation | $\Phi_{slurry}$ (1) % | $\Phi_{material}$ (2) % | Vol of rubber (3) % | $\Phi_{effective}$ (2) + (3) |
|---|---|---|---|---|
| 1 | 68 | 45.7 | 0 | 45.7 |
| 2 | 45 | 29.7 | 24.8 | 54.5 |
| 3 | 46 | 37.3 | 21.6 | 58.9 |
| 4 | 46 | 36.6 | 21.6 | 58.2 |
| 5 | 50 | 43.9 | 32.5 | 76.4 |
| 6 | 45 | 30.5 | 24.8 | 55.3 |
| 7 | 79 | 65.5 | 0 | 65.5 |
| 8 | 60 | 36.9 | 0 | 36.9 |

EXAMPLE 5

A base slurry with a density of 14 ppg was composed of Portland cement, rubber particles and water (formulation 2 in the preceding examples). To this base slurry, amorphous metal casting fibers or strips were added, available under the trade mark Fibraflex 5 mm from SEVA, Chalon-sur-Saône, France. Different concentrations of fibers were studied.

Bending tests were carried out at 170° C., using the same conditions as the preceding examples. The results are shown in Tables 9 and 10. Table 9 concerns bending strength (modulus of rupture Mr and Young's modulus in bending Ef). Table 10 concerns compressive strengths (compressive strength Cs and Young's modulus in compression Ec).

TABLE 9

MECHANICAL PROPERTIES: BENDING TESTS

| Fiber concentration (g/l) | Mr (MPa) | Ef (MPa) | Mr/Ef (×1000) | Energy (J) |
|---|---|---|---|---|
| 0 | 3.44 | 2213.71 | 1.57 | 0.0223 |
| 30 | 4.07 | 2328.83 | 1.75 | 0.0287 |
| 60 | 4.48 | 2772.52 | 1.65 | 0.0402 |
| 100 | 5.05 | 2551.87 | 2.01 | 0.0602 |

TABLE 10

MECHANICAL PROPERTIES: COMPRESSION TESTS

| Fibraflex concentration (g/l) | CS (MPa) | Ec (MPa) | CS/Ec (×1000) | Energy (J) |
|---|---|---|---|---|
| 0 | 9.97 | 1370.72 | 7.31 | 7.94 |
| 30 | 14.00 | 2545.63 | 5.52 | 6.95 |
| 90 | 14.04 | 2521.05 | 5.58 | 7.35 |

It can be seen that adding fibers increases modulus of rupture in bending and the ratio of that modulus of rupture over Young's modulus. The same trend was observed for the rupture energies obtained from the bending tests. Cements formulated with mixtures of rubber particles and fibers resulted in good compressive strengths.

Further, FIG. 6 is a graph of displacement as a function of the load exerted during the bending test. No increase in load was observed between the cement with no rubber particles and the cement with ground rubber particles. With rubber particles, however, the post rupture behavior was very different from a cement containing no rubber particles. Its tenacity was improved with ground rubber particles, and this post rupture behavior was still further improved with a mixture of rubber and fibers.

Tenacity is an important parameter in a multi-sidetrack well.

EXAMPLE 6

Cement samples were generated under pressure (3000 psi, 20.68 MPa) and temperature (170° F., 76.76° C.) under the same conditions as those used for the bending and compression tests and for the same period. The hardened material obtained was cored to the following dimensions: a diameter of 51.4 mm and a length of 25 mm.

The moist sample was placed in a Hassler type cell which applied a confinement pressure of 10 to 100 bars to the sample. A small constant flow of water (in the range 0.010 ml/min to 0.80 ml/min) was sent through the sample using a chromatographic pump. The differential pressure on the sample sides was measured and recorded. The value recorded was that corresponding to equilibrium.

The permeability K in milli-Darcy (mDa) was calculated using Darcy's law:

$$K = 14700 \frac{Q\mu L}{AP}$$

where Q is the flow expressed in ml/s, $\mu$ is the viscosity of the water in mPa.s., L is the length of the sample in cm, A is the surface area of the sample in $cm^2$ and P is the pressure differential in psi (1 psi=6.89 kPa).

The results for the different formulations are shown in Table 10A and demonstrate that adding rubber particles reduced the permeability of the cement.

TABLE 10A

PERMEABILITY RESULTS

| Formulation | Density ($g/cm^3$) | Rubber % bwoc | Permeability to water milli-Darcy |
|---|---|---|---|
| 1 | 1.67 | 0 | 0.0076 |
| 2 | 1.67 | 31 | 0.0015 |
| 7 | 1.44 | 0 | 0.1380 |
| 8 | 1.89 | 0 | 0.0010 |

EXAMPLE 7

Impact tests were carried out on cement samples. These tests consisted of allowing a 1 meter long projectile to fall onto set cement disks. The disks were circular, 70 mm in diameter 10 mm thick. The dynamic load was measured and recorded over time.

The cement with no rubber particles (formulations 1 and 7) behaved as a fragile material and the energy absorbed by the sample was estimated to be less than 10 Joules. The energy absorbed by cements formulated with rubber particles was much higher, as shown in Table 11.

TABLE 11

IMPACT RESULTS WITH FLEXIBLE PARTICLES

| Formulation | Energy (J) |
|---|---|
| 1 | 7.4 |
| 2 | 25.3 |
| 7 | 4.0 |

This good shock behavior is particularly important when cementing multi-sidetrack wells.

EXAMPLE 8

The linear expansion of cement slurries during setting at a temperature simulating well conditions was measured in an annular expansion mold. This mold consisted of two flat disks placed on either side of an extensible ring which had two pins at its extremities; the ensemble constituted a 100 mm diameter cylinder of low thickness (22 mm). The two disks were fixed together with screws. The cement slurry to be studied was poured into the mold, and the mold was placed in a thermostatted water bath at 76.76° C. The slurry remained in contact with the water throughout the test.

During setting, if the cement expanded, the external diameter of the extensible ring also expanded and the distance between the two pins of the ring increased.

The linear expansion L of the cement slurry was obtained using the following relationship:

$$L=(D2-D1)\times 10.95$$

where L is expressed as a percentage, D1 is the micrometric measurement in inches before the onset of hardening, D2 is the micrometric measurement in inches after hardening, and 10.95 is a constant which takes the mold geometry into account.

The expansion results are shown in Table 12 and show that a slurry containing rubber particles has advantageous expansion properties.

TABLE 12

EXPANSION RESULTS

| Rubber % bwoc | % linear expansion after 1 day | % linear expansion after 2 days | % linear expansion after 7 days |
|---|---|---|---|
| 0 | 0 | 0 | 0 |
| 31 | 0.25 | 0.28 | 0.28 |
| 71 | 0.15 | 0.25 | 0.29 |

EXAMPLE 9

A mixability and pumpability test was carried out using a slurry with formulation 2, with a density of 1.67 $g/cm^3$ containing 31% bwoc of rubber particles.

The rubber was dry blended with the cement and then added to the tank containing the mixing water. The mixture obtained was homogeneous, and circulated with a Triplex type pump routinely used in oil fields with no problems.

Mixing problems were observed in a further test with post addition of the rubber. Thus dry blending is the preferred method for incorporating rubber particles into cement slurry in the field.

What is claimed is:

1. A method of cementing a well, comprising:
    (a) preparing a pumpable slurry by mixing
        i) cement;
        ii) rubber particles having grain sizes in the range 250–425 $\mu$m in an amount of between 30% and 100% by weight of cement;
        iii) water; and
        iv) an antifoam agent;
        so as to form a slurry having a density below 1.70 $g/cm^3$; and
    (b) pumping the slurry into the well.

2. A method as claimed in claim 1, wherein the step of preparing the slurry comprises mixing rubber particles having grain sizes in the range 250 $\mu$m to 400 $\mu$m.

3. A method as claimed in claim 1, wherein the rubber particles are obtained by recycling tires from the automobile industry.

4. A method as claimed in claim 1, wherein the step of preparing the slurry further comprises mixing cast amor phous metal fibers in an amount of 1% to 25% by weight of cement.

5. A method as claimed in claim 4, wherein the metal fibers have lengths in the range 5–15 mm.

6. A method as claimed in claim 1, wherein the step of preparing the slurry further comprises mixing at least one additive selected from the group consisting of suspension agents, dispersing agents, retarders, cement setting accelerators, and fluid loss control agents.

7. A method as claimed in claim 1, wherein the rubber particles have a density of about 1.2 g/cm$^3$.

8. A method as claimed in claim 7, comprising mixing the rubber particles so as to form a slurry having a density of less than 1.44 g/cm$^3$.

9. A method as claimed in claim 1, further comprising dry blending the cement and rubber particles prior to mixing with water to form the slurry.

10. A method as claimed in claim 1, comprising preparing a slurry having a water content of 55% by volume or less.

* * * * *